United States Patent
Hwang

(10) Patent No.: US 8,957,877 B2
(45) Date of Patent: Feb. 17, 2015

(54) CAMERA MODULE AND OPTICAL TOUCH SCREEN USING THE SAME

(75) Inventor: Woong Hwang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 219 days.

(21) Appl. No.: 13/808,045

(22) PCT Filed: Jul. 6, 2011

(86) PCT No.: PCT/KR2011/004940
§ 371 (c)(1),
(2), (4) Date: Jan. 2, 2013

(87) PCT Pub. No.: WO2012/011686
PCT Pub. Date: Jan. 26, 2012

(65) Prior Publication Data
US 2013/0106789 A1 May 2, 2013

(30) Foreign Application Priority Data
Jul. 19, 2010 (KR) .......................... 10-2010-0069580

(51) Int. Cl.
*G06F 3/042* (2006.01)
*H04N 5/225* (2006.01)
*H04N 5/33* (2006.01)

(52) U.S. Cl.
CPC ............ *G06F 3/0425* (2013.01); *G06F 3/0428* (2013.01); *H04N 5/2257* (2013.01); *H04N 5/33* (2013.01)

USPC .......................................................... 345/175

(58) Field of Classification Search
None
See application file for complete search history.

(56) References Cited

U.S. PATENT DOCUMENTS

| 2005/0030287 | A1* | 2/2005 | Sato ............................. 345/158 |
| 2006/0007185 | A1* | 1/2006 | Kobayashi ................... 345/176 |
| 2006/0232792 | A1* | 10/2006 | Kobayashi ................... 356/621 |
| 2010/0315383 | A1 | 12/2010 | Chang et al. |

FOREIGN PATENT DOCUMENTS

| JP | 2008-241807 A | 10/2008 |
| KR | 10-0910024 B1 | 7/2009 |
| KR | 10-0963228 B1 | 6/2010 |

* cited by examiner

*Primary Examiner* — Nicholas Lee
(74) *Attorney, Agent, or Firm* — Birch, Stewart, Kolasch & Birch, LLP

(57) ABSTRACT

The present invention relates to a camera module and an optical touch screen using the same, the camera module including an infrared emitting diode for emitting infrared ray, a first infrared pass filter passing only the infrared ray reflected by a retro reflector, an object lens condensing the infrared ray that has passed the first infrared pass filter, a second infrared pass filter passing an infrared ray of a particular wave band among the infrared ray condensed by the object lens, and a linear sensor for detecting an area touched by incidence of infrared ray that has passed the second infrared pass filter.

20 Claims, 5 Drawing Sheets

Fig. 1
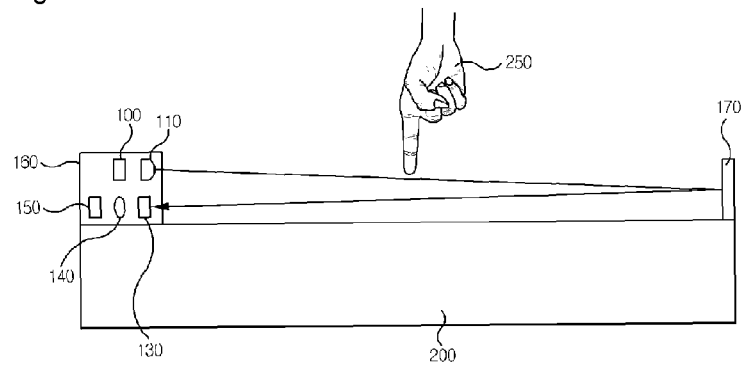
Fig. 2
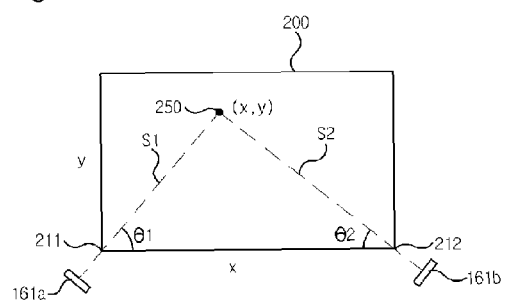
Fig. 3a
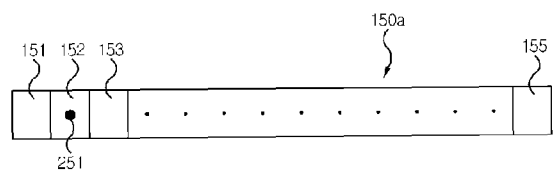
Fig. 3b
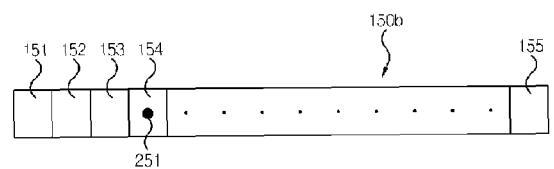
[Fig. 4]
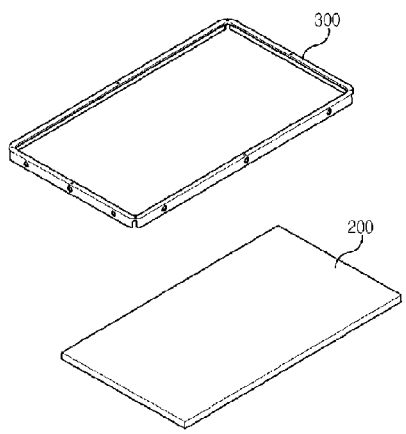

Fig. 8
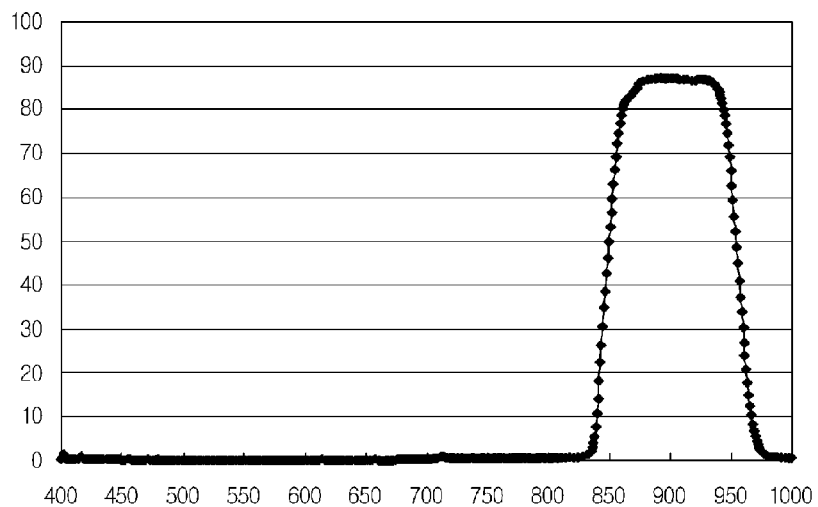
Fig. 9
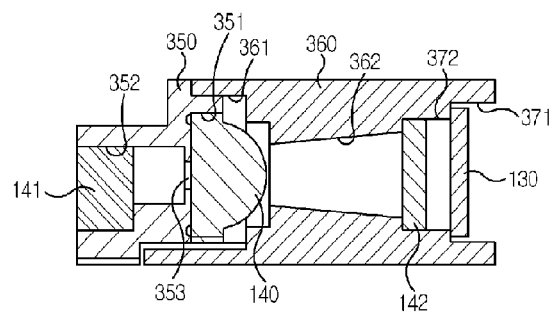
Fig. 10
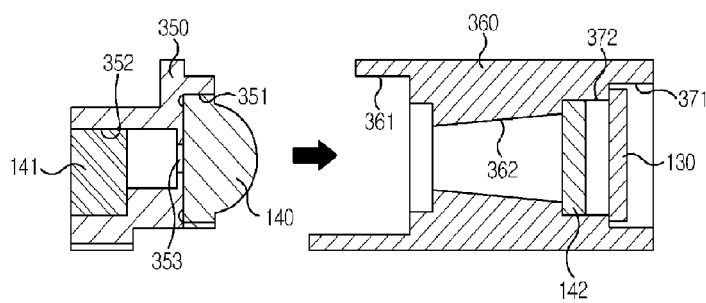
[Fig. 11a
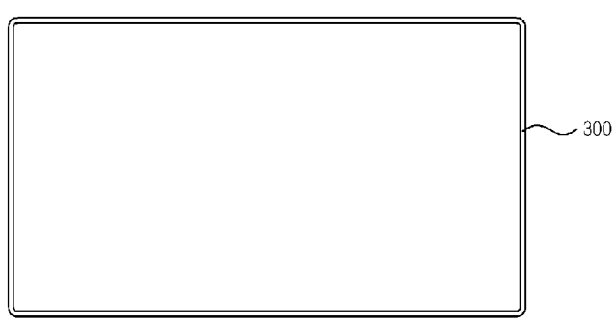

CAMERA MODULE AND OPTICAL TOUCH SCREEN USING THE SAME

TECHNICAL FIELD

The teachings in accordance with the exemplary embodiments of this invention relate generally to a camera module and an optical touch screen using the same.

BACKGROUND ART

A touch screen or touch panel is a display which can detect the location of touches within the display area, usually performed either with the human hand or a stylus. This allows the display to be used as an input device, removing the keyboard and/or the mouse as the primary input device for interacting with the display's content.

Technically speaking, the commonly used touch screens employ resistive, capacitive, surface acoustic wave (SAW), electromagnetic, vector force and optical touch modes. Among these types of touch screens, resistive type is the most common one, which has approximately 60% of market share (the second is capacitive type with around 24% of market share). Each of these types of touch screens has its own features, advantages and disadvantages.

Now, these touch screens are briefly explained.

The resistive is a common type of touch screen technology. It is a low-cost solution found in many touch screen applications, including hand-held computers, PDA's, consumer electronics, and point-of-sale-applications. The resistive touch screens are such that a pair of resistive layers facing with each other is provided on a touch screen element. The pressed position is detected by contact between the resistive layers so that one of the resistive layers is formed on a flexible film for deformation during pressing. As mentioned above, the resistive film type is widely used, but disadvantageous due to degraded mechanical and environmental reliability. At the same time, although the resistive touch screen today are widely used on consuming electronic products, it is unable to identify multiple contact points simultaneously on its display area.

The surface acoustic wave (SAW) touch screen first converts an electric signal into an ultrasonic wave through a transducer, and then directly transmits the ultrasonic wave through a surface of the touch panel. When the touch panel is used, the ultrasonic wave may be absorbed by contacting a pointer to cause attenuation, and an accurate position of the contact is obtained through comparison and calculation between attenuation amounts before and after use. The surface acoustic wave touch screen is disadvantageous due to generation of noise and/or susceptibility to noise.

The electromagnetic type touch screen is such that, in the field of magnetism, a magnetic field is normally generated by a coil due to electromagnetism and said magnetic field induces a voltage in another coil, also called receiver coil, under the premise that the magnetic field strength changes in the receiver coil. It is clear that a non-moving receiver coil is not capable to measure a non-altering magnetic field since no voltage is induced by said magnetic field. There are already means, which can measure a position and/or orientation of a receiver means in relation to a specific magnetic field generating means. To measure the orientation in a 3-dimensional space normally three orthogonal arranged probes are used to calculate the coordinates. These arrangements are most of the time very bulky, space taking and needs a special stylus.

The capacitance type touch screen adopts capacity changes generated from the combination of static electricity between arranged transparent electrodes and a human body, so as to detect coordinates of the contact position through a generated induced current. That is, the capacitance type touch screen includes one substrate having an electrode formed thereon. In the capacitance type touch panel, when, for example, a finger contacts and approaches the touch panel, a variation in capacitance between the electrode and the finger is detected, thereby detecting input coordinates. Since the capacitance type touch panel is a non-contact type, it has high durability, excellent environmental and mechanical reliability due to changeable upper barrier layer unlike the resistive film type touch panel. However, the capacitance type touch panel has disadvantages in that it is difficult to input information with fingers or a pen.

The optical type touch screens principally use no films for touch recognition such that transmittance is 100%. Furthermore, no reflexibility, degradation of brightness and blurring of displays are generated from these optical touch screens. Maintenance of transmittance and brightness in displays is an important factor for image clarity, such that an optical type is adequate for implementation of high quality screens. Furthermore, the optical type touch screens utilize the principle of light source reception and blocking, such that no load is applied to a sensor as detection is not performed by physical or electrical contacts, which increases reliability for use in factory monitoring, various automation equipment and ATM's. The optical type touch screens are advantageously free from such materials as films or ITO (Indium Tin Oxide) protective films to have less susceptibility to scratches or external shocks and a lower error probability including erroneous operation.

DISCLOSURE OF INVENTION

Technical Problem

The present invention is directed to simplify processes.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a camera module, the module characterized by: an infrared emitting diode for emitting infrared ray; a first infrared pass filter passing only the infrared ray reflected by a retro reflector; an object lens condensing the infrared ray that has passed the first infrared pass filter; a second infrared pass filter passing an infrared ray of a particular wave band among the infrared ray condensed by the object lens; and a linear sensor for detecting an area touched by incidence of infrared ray that has passed the second infrared pass filter.

Preferably, the camera module further includes a holder formed at one side with a first groove, and at the other side with a second groove, and formed with an opening connecting the first and second grooves, wherein the object lens is mounted at the first groove, the second infrared pass filter is mounted at the second groove, the image sensor is mounted at a printed circuit board, and the printed circuit board is attached to the holder to block the second groove.

Preferably, the second infrared pass filter is implemented by coating a second infrared pass filter material on a glass.

Preferably, the camera module further includes a first holder mounted at the first infrared pass filter and the object lens, and a second holder mounted with the second infrared pass filter and the image sensor.

Preferably, the camera module includes the first holder formed at one side with a first groove, and at the other side with a second groove, and formed with an opening connecting the first and second grooves, wherein the object lens is mounted at the first groove, and the first infrared pass filter is mounted at the second groove.

Preferably, the camera module includes the second holder formed at one side with a third groove, and at the other side with a fourth groove, with the fourth groove formed with a fifth groove, and formed with an opening connecting the third and fifth grooves, wherein the fourth groove is mounted with the second infrared pass filter, and the fifth groove is mounted at the image sensor.

Preferably, the first holder is coupled to the third groove of the second holder.

In another general aspect of the present invention, there is provided an optical touch screen, the screen characterized by: a flat plate display panel; a case mounted and assembled with the flat plate display panel; brackets assembled on corners of the case; a camera module mounted on the brackets, wherein the camera module includes an infrared emitting diode for emitting infrared ray, a first infrared pass filter passing only the infrared ray reflected by a retro reflector, an object lens condensing the infrared ray that has passed the first infrared pass filter, a second infrared pass filter passing an infrared ray of a particular wave band among the infrared ray condensed by the object lens, and a linear sensor for detecting an area touched by incidence of infrared ray that has passed the second infrared pass filter.

Preferably, at least one of the brackets is a dummy bracket that is not mounted with the camera module.

Preferably, a retro reflector is mounted on an inner lateral surface of the case among the brackets.

Preferably, the case takes the shape of a square ring.

Preferably, three inner corners of the square ring-shaped case are fixed by brackets on which the camera module is mounted, and one inner corner of the square-ring shaped case is mounted with a dummy bracket on which the camera module is not mounted.

Preferably, a retro reflector is mounted on an inner lateral surface of the case among the brackets.

Preferably, the optical touch screen further includes a retro reflector arranged along the inner lateral surface of the case.

Preferably, the optical touch screen further includes a frame mounted at the inner lateral surface of the case among the brackets, and the retro reflector is mounted at the frame.

Preferably, the case takes the shape of a square ring.

Preferably, the bracket includes first and second fixtures fixed on the case, and a connector connected to the first and second fixtures, wherein the camera module is mounted on the connector.

Preferably, the connector of the bracket includes a first passage through which infrared ray emitted from the camera module can pass, and a second passage through which infrared ray incident on the camera module can pass.

Preferably, the retro reflector is mounted at the first and second fixtures.

Preferably, the frame is formed with a groove, and the retro reflector is formed with a lug insertable into the groove, wherein the lug formed at the retro reflector is inserted into the groove formed at the frame to allow the retro reflector to be mounted at the frame.

Advantageous Effects of Invention

The camera module and optical touch screen using the same according to the present invention has an advantageous effect in that touch is detected by infrared ray of a particular wave band that has passed first and second infrared pass filters to increase a sensing efficiency.

The camera module and optical touch screen using the same according to the present invention has an advantageous effect in that infrared ray of unwanted wave band is blocked by the second infrared pass filter, and infrared ray of wanted wave band is incident on an image sensor.

BRIEF DESCRIPTION OF DRAWINGS

The teachings of the present invention can be readily understood by considering the following detailed description in conjunction with the accompanying drawings, in which:

FIG. 1 is a conceptual cross-sectional view illustrating an optical touch screen according to the present invention;

FIG. 2 is a conceptual view illustrating a method for detecting a coordinate of a particular area touched on an optical touch screen according to the present invention;

FIGS. 3a and 3b are schematic conceptual views illustrating a linear sensor of an optical touch screen according to the present invention;

FIG. 4 is a schematic perspective view illustrating a state in which an optical touch screen is fastened according to the present invention;

FIG. 8 is a graph of a wave band passed by a second infrared pass filter according to the present invention;

FIG. 9 is a schematic cross-sectional view illustrating a camera module according to another exemplary embodiment of the present invention;

FIG. 10 is a cross-sectional view illustrating a state in which the camera module of FIG. 9 is assembled;

FIGS. 11a through 11d are schematic plan views illustrating an assembly method of an optical touch screen according to the present invention;

BEST MODE FOR CARRYING OUT THE INVENTION

Figure 5:
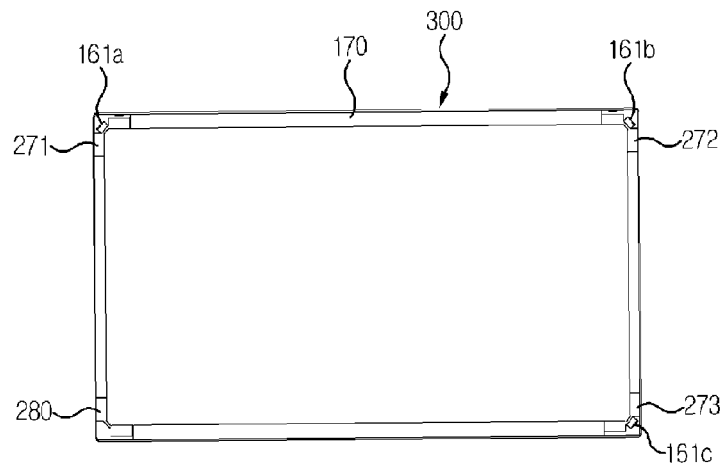
FIG. 5 is a schematic plan view illustrating a case of an optical touch screen according to the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-13 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

FIG. 1 is a conceptual cross-sectional view illustrating an optical touch screen according to the present invention.

An optical touch screen according to the present invention includes a camera module (160) and a retro reflector (170), all of which are mounted to a front surface of a flat plate display panel (200). The camera module (160) may include an infrared light emitting diode (100) emitting infrared ray, an IR (Infrared) pass filter (130) that passes only the infrared ray reflected from the retro reflector (170), and a linear sensor (150) detecting an area touched by the incident infrared ray that has passed the IR pass filter (130).

The touched area is defined by an area touched by a user on the flat plate display panel (200) of the optical touch screen.

At this time, the optical touch screen may further include an object lens (140) collecting the infrared ray that has passed the IR pass filter (130). Alternatively, the optical touch screen may be so configured as to allow the light emitted from the infrared light emitting diode (100) to be emitted through a lens (110).

Furthermore, the retro reflector (170) reflects the infrared ray emitted from the infrared light emitting diode (100), where an incident angle and reflection angle of the infrared ray are same. Therefore, the infrared light emitting diode (100) of the camera module (160) emits an infrared ray, where the emitted infrared ray advances along the flat plate display panel (200) to be reflected from the retro reflector (170) and incident on the IR pass filter (130) of the camera module (160).

At this time, the IR pass filter (130) passes only the infrared ray that has been reflected from the retro reflector (170), and the infrared ray that has passed the IR pass filter (130) is incident on the linear sensor (150). In a case a particular area of the flat plate display panel (200) is touched by a finger of a hand (250) while a user views an image displayed on the flat plate display panel (200), the infrared ray is blocked from the touched area to form a black spot on the linear sensor (150), whereby a coordinate of the touched particular area can be detected.

Furthermore, the flat plate display panel (200) is situated under an area between the infrared light emitting diode (100) and the retro reflector (170), and in a case a user touches a particular area of an image displayed on the flat plate display panel, a driving signal is generated that corresponds to a coordinate detected by the linear sensor (150), whereby various functions including screen change, sound adjustment, screen movement, screen enlargement and screen reduction can be performed. At this time, the flat plate display panel may be one of an LCD (Liquid Crystal Display), an FED (Field Emission Display), a PDP (Plasma Display Panel), an EL (Electroluminescence), an OLED (Organic Light Emitting Diode), and an electronic paper display panel.

FIG. 2 is a conceptual view illustrating a method for detecting a coordinate of a particular area touched on an optical touch screen according to the present invention, and FIGS. 3a and 3b are schematic conceptual views illustrating a linear sensor of an optical touch screen according to the present invention.

The camera module of the optical touch screen may be installed at two or three corner areas of the flat plate display panel (200). For example, as illustrated in FIG. 2, in a case first and second camera modules (161a, 161b) are mounted on two corner areas (211, 212) of the flat plate display panel (200), and a predetermined area (250) of the flat plate display panel (200) is touched, the touched predetermined area (250) is blocked of infrared ray, and each linear sensor of the first and second camera module (161a, 161b) is formed with a black spot. Therefore, the linear sensor can detect a coordinate of the touched particular area using a position of the black spot.

Each of the linear sensors (150a, 150b) of the first and second camera module (161a, 161b) is mounted with 1st to nth sensing pixel (151, 152, 153, 154, 155) as illustrated in FIGS. 3a and 3b. At this time, in a case the particular predetermined area of the flat plate display panel (200) is touched, one of the 1st to nth sensing pixel (151, 152, 153, 154, 155) is formed with the black spot. Furthermore, because each of the linear sensors (150a, 150b) of the first and second camera module (161a, 161b) is installed at a different position from that of the touched area, there is a high probability that the sensing pixel of the linear sensor (150a) of the first camera module (161a) is differently positioned from the linear sensor (150b) of the second camera module (161b).

For example, as depicted in FIG. 3a, a black spot (251) is formed at the second sensing pixel (152) on the linear sensor (150a) of the first camera module (161a), and as illustrated in FIG. 3b, a black spot (251) is formed at the fourth sensing pixel (154) on the linear sensor (150b) of the second camera module (161b).

Meanwhile, as shown in FIG. 2, if a crosswise direction of the flat plate display panel (200) is defined as an x axis, and a lengthwise direction of the flat plate display panel (200) is defined as a y axis, a coordinate of the touched area (250) can be extracted, if a connection line (S1) from the touched area (250) to the linear sensor (150a) of the first camera module (161a), a first angle (θ1) formed by a crosswise direction of the flat plate display panel (200), a connection line (S2) from the touched area (250) to the linear sensor (150b) of the second camera module (161b), a second angle (θ2) formed by a crosswise direction of the flat plate display panel (200) and a crosswise length of the flat plate display panel (200) are known.

Furthermore, the first angle (θ1) and the second angle (θ2) are changed according to the position of the touched area (250), and in response thereto, the 1st to the nth sensing pixel (151, 152, 153, 154, 155) of the linear sensors (150a, 150b) are subdivided. That is, each of the 1st to the nth sensing pixel (151, 152, 153, 154, 155) of the linear sensors (150a, 150b) corresponds to the first angle (θ1) and the second angle (θ2).

Therefore, in a case a black spot is formed on one of the sensing pixel of the 1st to the nth sensing pixel (151, 152, 153, 154, 155) of the linear sensors (150a, 150b) on the first and second camera modules (161a, 161b), the first angle (θ1) and the second angle (θ2) can be known, whereby a coordinate (x, y) of the touched area (250) can be extracted.

Furthermore, the optical touch screen may include a coordinate extraction calculator capable of extracting in real time a coordinate (x, y) of the touched area (250) touched by the aforementioned method or other methods, in a case a predetermined area (250) of the flat plate display panel (200) is touched.

FIG. 4 is a schematic perspective view illustrating a state in which an optical touch screen is fastened according to the present invention, and FIG. 5 is a schematic plan illustrating a case of an optical touch screen according to the present invention.

The optical touch screen according to the present invention may include a case (300) on which the flat plate display panel (200) is mounted, where the case (300) may be called a case top. The case (300) takes the shape of a square ring, and as shown in FIG. 5, an inner lateral surface of the square ring is mounted with the retro reflector (170), and two or three corner areas of the square ring is mounted and assembled with camera modules (161a, 161b, 161c).

At this time, the camera modules (161a, 161b, 161c) are mounted on brackets (271, 272, 273), and each of the brackets (271, 272, 273) is mounted at three square ring corners. Furthermore, a balance one square ring corner is mounted with a dummy bracket (280) that is not mounted with a camera module. That is, the optical touch screen includes the flat plate display panel (200), the square ring-shaped case (300) on which the flat plate display panel (200) is assembled and attached, the brackets assembled on corners of the case (300), and the camera modules (161a, 161b, 161c). At least one of the brackets is a bracket that is not mounted with the camera modules (161a, 161b, 161c). An inner lateral surface of the case (300) in the brackets is mounted with the retro reflector (170). The retro reflector (170) is also mounted on the dummy bracket (280).

Figure 6:
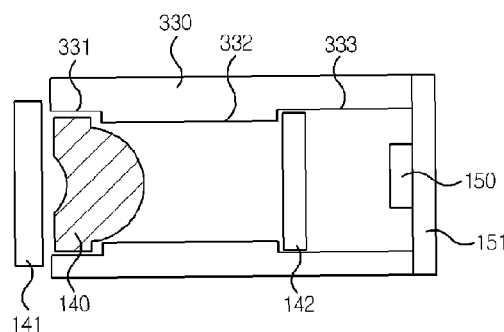
FIG. 6 is a schematic cross-sectional view illustrating a camera module according to an exemplary embodiment of the present invention.
Figure 7:
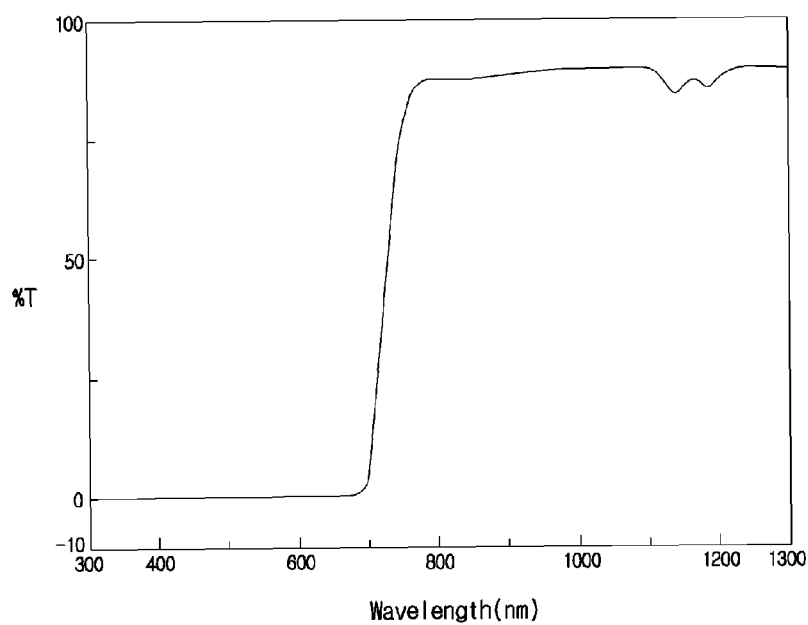
FIG. 7 is a graph of a wave band passed by a first infrared pass filter according to the present invention.

FIG. 6 is a schematic cross-sectional view illustrating a camera module according to an exemplary embodiment of the present invention, FIG. 7 is a graph of a wave band passed by a first infrared pass filter according to the present invention, and FIG. 8 is a graph of a wave band passed by a second infrared pass filter according to the present invention.

The camera module according to the present invention includes a first infrared pass filter (141) passing only an infrared ray, and a second infrared pass filter (142) passing an infrared ray of a particular wave band among the infrared ray that has passed the first infrared pass filter (141).

That is, the camera module according to the present invention includes an infrared emitting diode for emitting infrared ray; a first infrared pass filter (141) passing only the infrared ray reflected by a retro reflector; an object lens (140) condensing the infrared ray that has passed the first infrared pass filter (141); a second infrared pass filter (142) passing an infrared ray of a particular wave band among the infrared ray condensed by the object lens (140); and a linear sensor (150) for detecting an area touched by incidence of infrared ray that has passed the second infrared pass filter (142).

That is, the camera module according to the present invention is configured in such a manner that the first infrared pass filter (141) initially passes an infrared ray, the second infrared pass filter (142) secondly passes an infrared ray of a particular wave band, and the linear sensor (150) detects the touch using the infrared ray of particular wave band. The first infrared pass filter (141) does not pass the visible light, but passes the infrared ray only, as illustrated in FIG. 7. The second infrared pass filter (142) passes only an infrared ray of a particular wave band (approximately 820 nm~970 nm) among the infrared ray that has passed the first infrared pass filter (141), as illustrated in FIG. 8.

Therefore, the present invention has an advantage in that the touch is detected by infrared ray of a particular wave band that has passed the first and second infrared pass filters (141, 142) to increase the sensing efficiency.

The present invention has a further advantage in that an infrared ray of an unwanted wave band is blocked by the second infrared pass filter (142), and an infrared ray of wanted wave band is incident on the image sensor.

One exemplary structure for implementing the camera module includes, as illustrated in FIG. 6, a holder (330) formed at one side with a first groove (331), and at the other side with a second groove (333), and formed with an opening (332) connecting the first and second grooves (331, 333), wherein the object lens (140) is mounted at the first groove (331), the second infrared pass filter (142) is mounted at the second groove (333), the image sensor (150) is mounted at a printed circuit board (151), and the printed circuit board is attached to the holder (380) to block the second groove (333).

Therefore, the object lens (140) is frontally positioned with the first infrared pass filter (141) to allow the infrared ray that has passed the first pass filter (141) to pass the object lens (140) and the second infrared pass filter (142), whereby the image sensor (150) can detect the infrared ray of a particular wave band. At this time, the second infrared pass filter (142) may be embodied by coating a second infrared pass filter material on a glass. Furthermore, the glass functions as a cover plate to protect the image sensor.

FIG. 9 is a schematic cross-sectional view illustrating a camera module according to another exemplary embodiment of the present invention, and FIG. 10 is a cross-sectional view illustrating a state in which the camera module of FIG. 9 is assembled.

An exemplary configuration for assembling the first and second infrared pass filters (141, 142) will be described with reference to FIG. 9.

First, the camera module includes a first holder (350) mounted with the first infrared pass filter (141) that passes the infrared ray, and the object lens (140) condensing the infrared ray that has passed the first infrared pass filter (141), and a second holder (360) mounted with the second infrared pass filter (142) passing an infrared ray of a particular wave band among the infrared ray condensed by the object lens (140) and the image sensor (150) detecting a touch by the infrared ray that has passed the second infrared pass filter (142).

In further detailed example, the first holder (350) may be formed at one side with a first groove (351) and at the other side with a second groove (352), and with an opening (353) for connecting the first and second grooves (351, 352). The first groove (351) of the first holder (350) may be mounted with the object lens (140), and the second groove (352) may be mounted with the first infrared pass filter (141).

Furthermore, the second holder (360) may be formed at one side with a third groove (361), and at the other side with a fourth groove (371), where the fourth groove (371) may be formed with a fifth groove (372), and an opening (362) may be formed for connecting the third and fifth grooves (361, 372).

At this time, the fourth groove (371) of the second holder (360) may be formed with the second infrared pass filter (142), and the fifth groove (372) may be formed with the image sensor (150).

Referring to FIG. 10, the first holder (350) is coupled to the third groove (361) of the second holder (360).

FIGS. 11a through 11d are schematic plan views illustrating an assembly method of an optical touch screen according to the present invention.

The method of assembling an optical touch screen according to the present invention is to first prepare the square ring shaped case (300), as illustrated in FIG. 11a.

Figure 11B:
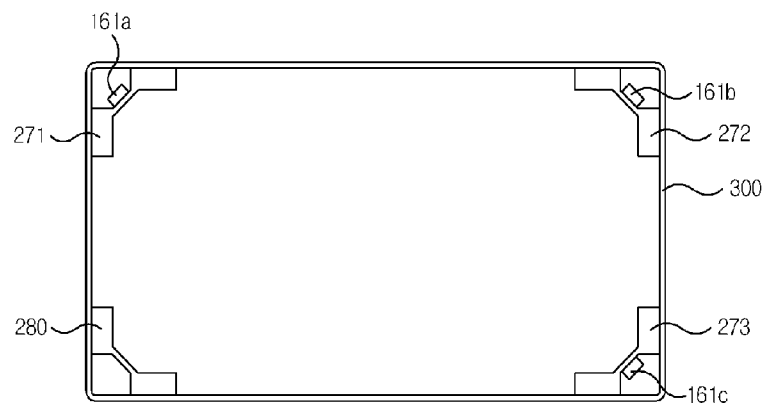

Next, the brackets (271, 272, 273) mounted at three square ring corners of the square ring shaped case (300) are fixed, and the dummy bracket (280) that is not mounted with the camera modules (161a, 161b, 161c) is fixed at one inner lateral corner of the square ring shaped case (300) (FIG. 11b).

In the brackets (271, 272, 273) mounted with the camera modules (161a, 161b, 161c), infrared ray is emitted from the camera modules (161a, 161b, 161c) and the brackets (271, 272, 273) are formed with openings (not shown) through which the infrared ray can be incident reflected from the retro reflector (170). The dummy bracket (280) is not formed with an opening which is not needed.

Figure 11C:
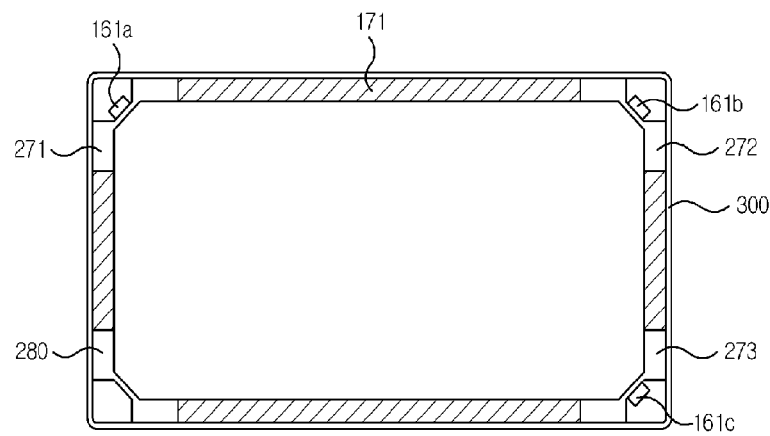
Figure 11D:
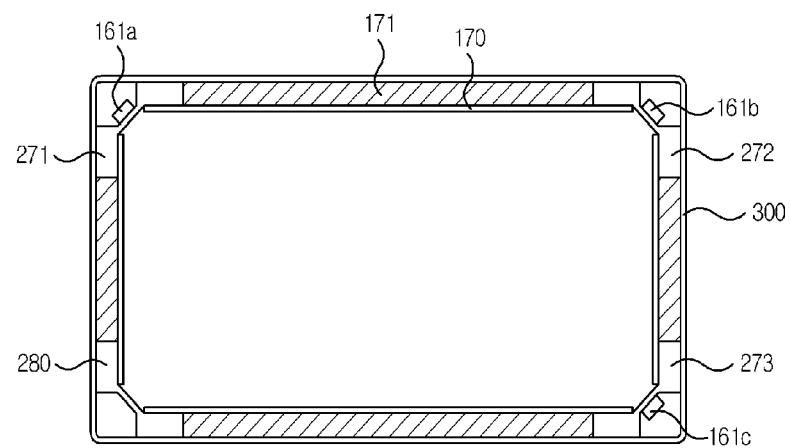

Successively, an inner lateral surface of the case in the brackets (271, 272, 273, 280) is mounted with a frame (171) for fixing the retro reflector (170) (FIG. 11c). Referring to FIG. 11c, the brackets (271, 272, 273, 280) means the brackets (271, 272, 273) that are mounted with camera modules (161a, 161b, 161c) and the dummy bracket (280) that is not mounted with camera module.

Thereafter, the retro reflector (170) is fixed at the frame (171) and the dummy bracket (280) (FIG. 11d), where the retro reflector (170) can be fixed without blocking each opening of the brackets (271, 272, 273) mounted with camera modules (161a, 161b, 161c). Following the assembly process of FIG. 11d, the flat plate display panel is mounted on the case (300).

Figure 12:
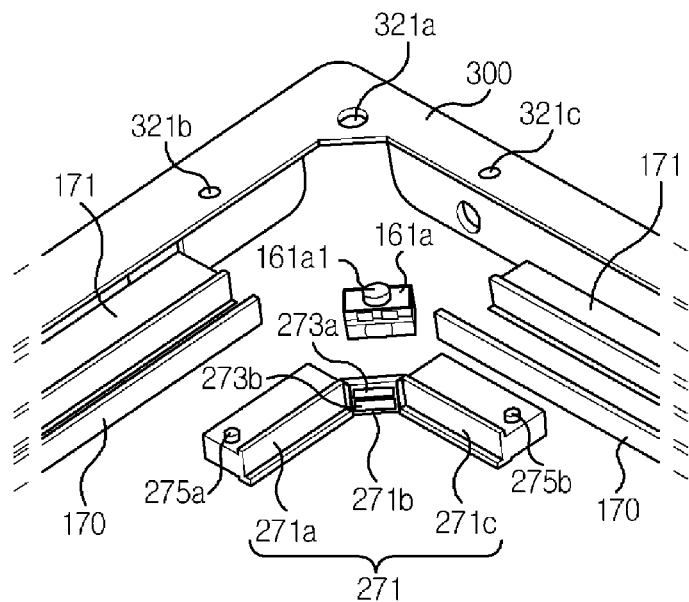
FIG. 12 is a schematic partial perspective view illustrating in detail an assembly method of an optical touch screen according to the present invention.

FIG. 12 is a schematic partial perspective view illustrating in detail an assembly method of an optical touch screen according to the present invention.

The bracket mounted with the camera module (161a) includes first and second fixtures (271a, 271c) fixed on the case (300) and a connector (271b) connected to the first and second fixtures (271a, 271c).

The assembly method of optical touch screen according to the present invention is initially to mount the camera module (161a) to the connector (271b) of the bracket (271), where the connector (271b) of the bracket (271) includes a first passage (273a) through which infrared ray emitted from the camera module (161a) can pass, and a second passage (273b) through which infrared ray incident on the camera module can pass.

The first and second passages (273a, 273b) may be embodied by an opening formed at the connector (271b) of the bracket (271) as illustrated in FIG. 12, but it is not limited thereto.

Successively, the bracket (271) mounted with the camera module (161a) is mounted at a corner of the case (300).

To be more specific, the camera module (161a) is formed with a first lug (161a1), and the first and second fixtures (271a, 271c) of the bracket (271) are formed with second and third lugs (275a, 275b), as shown in FIG. 12. The case (300) is formed with first, second and third fastening holes (3211, 321b, 321c) corresponding to the first, second and third lugs (161a1, 275a, 275b).

The first, second and third lugs (161a1, 275a, 275b) are inserted into the first, second and third fastening holes (3211, 321b, 321c), and the camera module (161a) and the bracket (271) are mounted at the case (300).

Next, the frame (171) is mounted at the case (300), and the retro reflector (170) is mounted at the frame (171). At this time, the retro reflector (170) may be mounted at the first and second fixtures (271a, 271c) of the bracket (271).

Therefore, the present invention is advantageous in that the camera module can be easily mounted at the case through the bracket, and the retro reflector can be easily assembled on the frame mounted at the case, whereby each constituent element can be simply aligned. The present invention is further advantageous in that the camera module and the retro reflector can be saved from being mounted to a high-priced reinforced glass, whereby the manufacturing cost can be reduced.

MODE FOR THE INVENTION

Figure 13A:
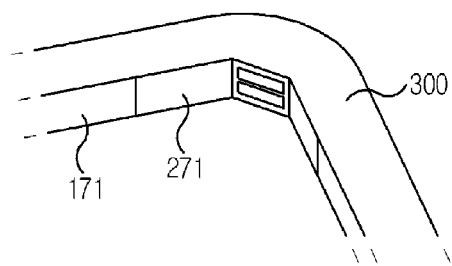
FIGS. 13a and 13b are schematic partial perspective view illustrating in detail a process in which a retro reflector is attached in an assembly method of an optical touch screen according to the present invention.
Figure 13B:
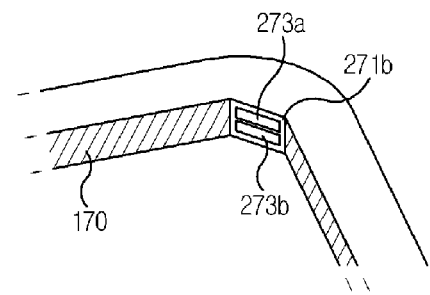

FIGS. 13a and 13b are schematic partial perspective view illustrating in detail a process in which a retro reflector is attached in an assembly method of an optical touch screen according to the present invention.

Referring to FIG. 13a, the case (300) is mounted with the bracket (271) formed with the camera module (161a) and the frame (171), and then, the retro reflector (170) is mounted to the frame (171) and a partial area of the bracket (271), as shown in FIG. 13b.

At this time, only the connector (271b) of the bracket (271) is exposed, and the retro reflector (170) is encompassed by the inner lateral surface of the case (300) to reflect the infrared ray. The infrared ray emitted from the camera module (161a) is emitted to the first passage (273a) of the connector (271b) at the bracket (271), and the emitted infrared ray is reflected by the retro reflector (170) to enter the second passage (273b). As a result, the infrared ray emitted from the camera module (161a) and the incident infrared ray are not intervened therebetween.

Meanwhile, the frame (171) and the partial area of the bracket (271) may be formed with a groove, and the retro reflector (170) may be formed with a lug insertable into the groove (171a).

Therefore, the present invention is advantageous in that the retro reflector (170) can be easily coupled to the frame (171) and the bracket (271) by the groove formed on the frame (171) and the bracket (271), and the lug formed on the retro reflector (170), by way of shield bar coupling method.

Alternatively, in a case each of the upper and bottom surfaces of the frame (171) and the bracket (271) is formed with guide, the guides form a concave area therebetweeen, where the retro reflector (170) can be inserted into the concave area between the guides.

That is, the retro reflector (170) can be variably embodied by being coupled to the frame (171) and the bracket (271) using the shield bar coupling method.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has an industrial applicability in that a camera module capable of enhancing a sensing efficiency can be applied to a touch screen.

The invention claimed is:

1. A camera module, the module comprising: an infrared emitting diode for emitting infrared ray; a first infrared pass filter passing only the infrared ray reflected by a retro reflector; an object lens condensing the infrared ray that has passed the first infrared pass filter; a second infrared pass filter passing an infrared ray of a particular wave band among the infrared ray condensed by the object lens; and a linear sensor for detecting an area touched by incidence of infrared ray that has passed the second infrared pass filter.

2. The camera module of claim 1, further comprising a holder formed at one side with a first groove, and at the other side with a second groove, and formed with an opening connecting the first and second grooves, wherein the object lens is mounted at the first groove, the second infrared pass filter is mounted at the second groove, the image sensor is mounted at a printed circuit board, and the printed circuit board is attached to the holder to block the second groove.

3. The camera module of claim 1, wherein the second infrared pass filter is implemented by coating a second infrared pass filter material on a glass.

4. The camera module of claim 1, further comprising a first holder mounted at the first infrared pass filter and the object lens, and a second holder mounted with the second infrared pass filter and the image sensor.

5. The camera module of claim 4, wherein the first holder formed at one side with a first groove, and at the other side with a second groove, and formed with an opening connecting the first and second grooves, wherein the object lens is mounted at the first groove, and the first infrared pass filter is mounted at the second groove.

6. The camera module of claim 4, wherein the second holder formed at one side with a third groove, and at the other side with a fourth groove, with the fourth groove formed with a fifth groove, and formed with an opening connecting the third and fifth grooves, wherein the fourth groove is mounted with the second infrared pass filter, and the fifth groove is mounted at the image sensor.

7. The camera module of claim 4, wherein the first holder is coupled to the third groove of the second holder.

8. An optical touch screen comprising: a flat plate display panel; a case mounted and assembled with the flat plate display panel; brackets assembled on corners of the case; a camera module mounted on the brackets, wherein the camera module includes an infrared emitting diode for emitting infrared ray, a first infrared pass filter passing only the infrared ray, an object lens condensing the infrared ray that has passed the first infrared pass filter, a second infrared pass filter passing an infrared ray of a particular wave band among the infrared ray condensed by the object lens, and a linear sensor for detecting an area touched by incidence of infrared ray that has passed the second infrared pass filter.

9. The optical touch screen of claim 8, wherein at least one of the brackets is a dummy bracket that is not mounted with the camera module.

10. The optical touch screen of claim 8, wherein a retro reflector is mounted on an inner lateral surface of the case among the brackets.

11. The optical touch screen of claim 8, wherein the case takes the shape of a square ring.

12. The optical touch screen of claim 11, wherein three inner corners of the square ring-shaped case are fixed by brackets on which the camera module is mounted, and one inner corner of the square-ring shaped case is mounted with a dummy bracket on which the camera module is not mounted.

13. The optical touch screen of claim 12, wherein a retro reflector is mounted on an inner lateral surface of the case among the brackets.

14. The optical touch screen of claim 9, further comprising a retro reflector arranged along the inner lateral surface of the case.

15. The optical touch screen of claim 14, further comprising a frame mounted at the inner lateral surface of the case among the brackets, and the retro reflector is mounted at the frame.

16. The optical touch screen of claim 14, wherein the case takes the shape of a square ring.

17. The optical touch screen of claim 14, wherein the bracket includes first and second fixtures fixed on the case, and a connector connected to the first and second fixtures, wherein the camera module is mounted on the connector.

18. The optical touch screen of claim 17, wherein the connector of the bracket includes a first passage through which infrared ray emitted from the camera module can pass, and a second passage through which infrared ray incident on the camera module can pass.

19. The optical touch screen of claim 17, wherein the retro reflector is mounted at the first and second fixtures.

20. The optical touch screen of claim 14, wherein the frame is formed with a groove, and the retro reflector is formed with a lug insertable into the groove, wherein the lug formed at the retro reflector is inserted into the groove formed at the frame to allow the retro reflector to be mounted at the frame.

* * * * *